United States Patent Office 3,406,528
Patented Oct. 22, 1968

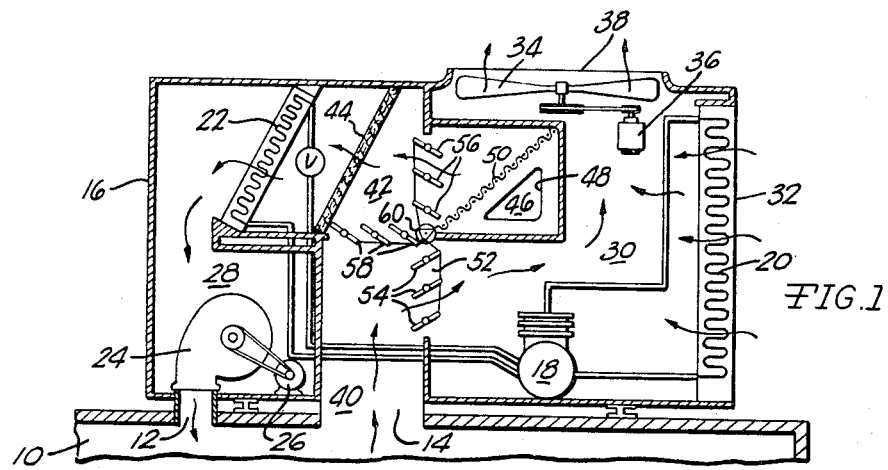

3,406,528
AIR-CONDITIONING SYSTEM
John C. Dijt, Jackson, Mich., assignor to Acme Industries, Inc., Jackson, Mich., a corporation of Delaware
Filed Dec. 22, 1966, Ser. No. 603,891
5 Claims. (Cl. 62—89)

ABSTRACT OF THE DISCLOSURE

An air-conditioning system and apparatus particularly concerned with the method of controlling condenser pressure in a refrigerating air conditioning system capable of using ventilating air. The apparatus of the invention being capable of accurately mixing ventilating and cooled air, as well as providing conditioning solely with ventilating air or cooled air, depending upon the type of conditioning required and the outside air temperatures.

---

As the weather conditions within any given locale normally vary significantly, the most economical air-conditioning operation can be achieved by the utilization of versatile equipment. For instance, it is common to use ventilating air to produce the cooling of an enclosure if the outside air temperature is low enough to produce the desired interior temperature. Additionally, it is known to mix ventilating air with air cooled by a refrigeration system to produce a combination of recooled and ventilating air and, thus, provide fresh and recirculated air. When ventilating air is introduced into an enclosure, it is necessary to employ some type of exhaust means to prevent the buildup of pressure within the enclosure if the enclosure is not able to otherwise permit the ventilating air to escape therefrom.

When those air-conditioning conditions arise wherein an enclosure is subjected to such an internal heat load that it is desirable to provide cooling when relatively low outside temperatures exist, the proportions of artificially cooled air and ventilating air can be varied to provide optimum operating characteristics. In a common refrigeration circuit for an air-cooled air conditioner, a compressor is utilized in conjunction with an evaporator coil and a thermostatic expansion valve. A blower is used to blow or draw air through the evaporator coil and a separate condenser fan is normally employed to draw air through the condenser coil. In those conditions where the ventilating air is relatively cool and yet the heat load calls for cooling, operation of the refrigeration circuit is complicated by the fact that excessive cooling of the condenser may occur due to the designed flow of air through the condenser. Excessive cooling of the condenser will lower the condenser pressure, resulting in lower evaporator pressures, which may render the system inoperative.

It is an object of the invention to provide an air-conditioning system of the above type wherein ventilating air may be mixed with air returned from the conditioned enclosure, and the pressure within the condenser and evaporator coils may be maintained even when the air cooling condenser is relatively cool.

It is another object of the invention to provide an air-conditioning system which is able to produce cooling during cool weather conditions wherein outside air may be efficiently employed to minimize, and in some cases eliminate, operation of the refrigeration system.

Another object of the invention is to provide an air-conditioning system utilizing ventilating air wherein exhausting means are also employed to prevent the buildup of static air pressure within the conditioned enclosure, the exhausting means being related to the introduction of ventilating air into the enclosure so that a constant pressure within the enclosure may be maintained.

A further object of the invention is to provide an air-conditioning system utilizing ventilating air wherein a single exhaust fan is employed to provide exhausting of the enclosure being conditioned, as well as drawing air through the refrigeration system condenser coil, wherein the fan serves a dual function and control means are associated with the ventilating air supply and the exhaust supply to proportionally relate the amount of ventilating and exhaust air being utilized and correlate the amount of such air utilized with the condenser and evaporator coil pressures to provide an automatic control of the pressures therein.

A further object of the invention is to provide a method of operating an air-conditioning system utilizing a condenser coil wherein the pressure within the condenser coil is regulated by controlling the amount of cooling air flowing through the coil.

These and other objects of the invention arising from the details and relationships of the components of an embodiment thereof will be apparent from the following description and accompanying drawings wherein:

FIG. 1 is a sectional, diagrammatical view of an air-conditioner system in accord with the invention illustrating the air control means in the position wherein substantially equal amounts of air is flowing through the return air passage, ventilating air passage and exhaust air passage, FIG. 2 is a detail, diagrammatical view of the air control means in a recirculating cycle condition, and FIG. 3 is a diagram of the electrical circuit utilized with the described embodiment of the invention.

The basic structure and relationship of components utilized to practice the invention will be appreciated from FIG. 1. In FIG. 1 the enclosure being conditioned is represented at 10 and includes an inlet 12 and an outlet 14. The air-conditioning system may be enclosed within a housing 16 adjacent the room 10.

The housing 16 includes a refrigeration compressor 18 driven by an electric motor, not shown. By appropriate tubing the compressor 18 is connected to a conventional condenser coil 20 and an evaporator coil 22. The usual expansion valves and other components of a conventional air-conditioner refrigeration system are also employed. A blower or fan 24 is located within the housing 16 and is in communication with the enclosure inlet 12. The blower 24 is powered by electric motor 26 through a belt. The blower 24 is located within the chamber 28 defined in the housing 16 whereby air drawn into the chamber by the blower passes through the evaporator coil 22.

A second chamber 30 is defined in the housing 16 in which the condenser coil 20 is located. A condenser coil cooling air inlet, normally in the form of a grill 32, is defined in the housing 16 and an exhaust fan 34 driven by an electric motor 36 is located within a housing outlet 38 whereby air may be drawn into the chamber 30 through the condenser coil 20 to condense the refrigerant.

Intermediate the chambers 28 and 30 is located a return air passage 40 communicating at its lower end with the enclosure outlet 14 and selectively communicating at its upper end with a chamber 42. The chamber 42 is partially defined by a filter 44 in communication with evaporator coil 22 whereby the blower 24 can draw air from chamber 42 through the filter and evaporator. A ventilating air passage 46 is formed in the housing 16 and is adapted to selectively communicate with chamber 42, as will be described. The air passage 46 receives outside air through an inlet 48 formed in the housing 16 and a filter or screen 50 prevents the entrance of insects into the system.

The chamber 30 is provided with a second inlet 52 constituting an exhaust air passage. The exhaust air passage 52 communicates with the return air passage 40, and the amount of air flowing through the exhaust air passage is controlled by a plurality of pivotally mounted vanes 54, which are shown in a half-open position in FIG. 1 and a closed position in FIG. 2. The amount of air flowing from the ventilating air passage 46 into the chamber 42 is controlled by a plurality of pivotally mounted vanes 56, and the amount of air flowing from the return air passage 40 into the chamber 42 is controlled by a plurality of pivotally mounted vanes 58. It will be noted the exhaust air passage 52 is located intermediate the pivotally mounted vanes 58 and the enclosure outlet 14.

Preferably, the vane sets 54, 56 and 58 are linked together for simultaneous operation by an electric motor 80. As it is usually desirable that a predetermined amount of fresh ventilating air be added to the recirculated enclosure air when the outside air temperature is relatively high, above 70° F., for instance, the linkages interconnecting the vane sets with the motor 60 are initially adjusted to provide the desired air flow therethrough under given conditions as set forth below. If it is desired that 15% "new" or ventilating air be added to the system during cooling when the outside temperature is relatively high, the linkage from motor 60 to ventilating air passage vanes 56 is adjusted to open vanes 56 15% when motor 60 is at its minimum position. The linkage to vanes 58 is adjusted to be at 85% open at the minimum position of motor 60 and exhaust vanes 54 are adjusted to be fully closed. This condition is represented in FIG. 2.

The electric circuit control utilized with the apparatus disclosed in FIGS. 1 and 2 is shown in FIG. 3. The power supply to the control is through a transformer 62 and the circuit includes a compressor crankcase heater 64, as is often employed with refrigeration systems. The motor starter for the conditioner blower motor 26 is represented at 66. The ventilating fan motor starter is represented at 68, and the compressor motor starter is represented at 70. Overload circuit breakers for the motors are represented at 72. Relay 74 is utilized in the circuit to the ventilating fan motor and the compressor motor and relay 76 is utilized to control operation of the ventilating fan motor when the compressor is not energized. The compressor motor is provided with the usual high pressure switch 78 and the low pressure switch 80.

The temperature-sensing apparatus is supplied through a transformer 82 and includes an outside temperature-sensing thermostat 84 utilizing a bulb 86 which is placed in the ventilating air passage 46 for sensing the temperature of the outside air. The thermostat 84 includes terminals A, B, and C. A minimum position switch 88 is employed between the outside thermostat and the vane motor 60 and a modulating return air controller 90 employs terminals D, E, F, which represent a potentiometer control, and terminals G and H, and is operated by a sensing bulb 92 located within the return air passage 40. The vane control motor regulator 94 is provided with terminals J, K, and M, which represent the vane motor control system.

The operation of the device will now be described.

Under warm summer weather conditions wherein the temperature of the outside air is higher than that which can be used for cooling, i.e. 70° F., the bulb 86 will have closed or interconnected terminals A and B providing an electric circuit to the vane motor regulator 94 through the minimum position switch 88 and terminal J.

When the terminals A and B are closed, the operation of the vane motor 60 to its minimum position positions the vanes to close the vanes 54 and to open the return air passage vanes 59, 85% and only permit the vanes 56 to be 15% open, assuming 15% ventilating air is desired, as shown in FIG. 2. With the primary power switch 96 closed, the air-conditioning unit operates in the normal manner, as the return air controller 90 will sense the need for cooling in the enclosure 10 closing contacts G and H, energizing relay 74 to start the exhaust fan 34 and the compressor 18. The exhaust fan 34 will be drawing all of its air into the chamber 30 through the inlet 32 and through the condenser coil 20 to provide maximum cooling of the condenser coil. The conditioner blower 24 will be drawing 85% of its air from the return air passage 40 and 15% of its air from the ventilating air passage 46 and pulling this air mixture through the evaporator 22 and, thus, a cooling cycle results which produces cooling of the enclosure 10. When the temperature within the enclosure has been sufficiently lowered, this temperature change will be sensed by the bulb 92 operating controller 90 to open G and H deenergizing the compressor and the exhaust fan 34, and only blower 24 will operate until the return air temperature again increases, and once again the compressor and exhaust fan will be energized to start the refrigeration cycle.

When the outside temperature is sufficiently cool to permit cooling without requiring refrigeration, i.e., below 70° F., the bulb 86 will close the contacts B and C and open contacts A and B. This condition disconnects the minimum position switch 88 from the vane motor regulator and connects the potentiometer of the return air controller 90 represented by terminals D, E and F to the vane motor. The potentiometer range is 3° F., the top scale of this range being .5° F. lower than the closing point of the thermostat contacts G and H of the return air controller 90. Thus, as the return air temperature from the encolsure 10 is sensed by bulb 92, the potentiometer signals the vane motor regulator 94 and opens or closes the ventilating air vanes 56, the exhaust air vanes 54, and the return air vanes 58 in accord with the temperature requirements.

Cooling of the enclosure 10 under the above conditions is produced solely by ventilating air and is controlled by modulating the vane motor 60 in accord with the signal received from the potentiometer of control 90. As the need for cooling increases and the temperature of enclosure 10 rises, this condition is sensed by bulb 92, causing the potentiometer to energize the vane motor 60 to open vanes 56 and 54 and close vanes 58. Thus, the temperature of the enclosure is regulated by varying the ratio of ventilating air and recirculated air. During this operation circulation is accomplished by the blower 24 and fan 34 as explained below.

The vane motor regulator contains auxiliary switch 98 which closes at a certain point of vane motor operation, i.e., when vanes 54 and 56 begin to open, 10% for instance, and vanes 58 are almost closed, thereby energizing relay 76 and starting the ventilating fan motor 36 exhausting enclosure 10 by drawing air into the chamber 30 through the exhaust air passage 52 and return air passage 40. As the heat load increases, vanes 54 and 56 increasingly open and a greater amount of cool air from the ventilating inlet passage 46 will be drawn into the chamber 42.

It will be understood that when the outside temperature is low, heating means will normally be supplying heat to the enclosure, and such heat could be accomplished by an electric strip heater within chamber 28, if desired. When no cooling is required vanes 58 will be fully open to permit 100% recircualtion by blower 94.

As long as the temperature within the enclosure 10 is within the range of the potentiometer of the return air controller 90, cooling of the enclosure will be provided solely by the outside air, and the exhausting of the air from the enclosure through the exhaust passage 52 will prevent any increase in the static air pressure within the enclosure. If the return air temperature rises .50° F. above the potentiometer range of the return air controller 90, the thermostat contacts G and H of the return air controller close to energize relay 74 and start the compressor 18. This condition occurs when the outside air is not cool enough to take care of the heat load within the enclosure, thus, making it necessary to artificially cool the air entering the enclosure by means of the refrigeration circuit. Under these conditions the vanes 54 and 56 are fully open and vanes 58 are closed, and the temperature in the enclosure is maintained by cycling of the refrigeration system as contacts G and H open and close.

When the above condition occurs, i.e., the outside air cycle is energized, freezing of the evaporator coil may cannot provide adequate cooling and the refrigeration occur if means are not provided to prevent such occurrence. The formation of frost at the evaporator coil would result from a lowering of the pressure of the refrigerant at the condenser coil due to excessive cooling of the condenser coil. Excessive cooling of the condenser coil would occur if all the air moved by fan 34 passed through the coil 20 since the air pulled through the coil is relatively cool and the size of the condenser is determined by its heat exchanging capacity at a relatively high outside air temperature such as occurs during the summer. Thus, if the entire volume of air moved by fan 34 passed through condenser coil 20 when the outside air temperature is below 70° F., the refrigerant pressure within the coil might drastically drop causing the evaporator to frost and freeze and prevent the flow of air therethrough.

However, when cooling the ventilating air, as above, the vanes 54 and 56 are fully open, which permits air to enter the chamber 30 through the exhaust air passage 52. Thus, the full capacity of the fan 34 is not pulling air through the condenser coil 20. The fact that air can enter the chamber 30 through the exhaust air passage 52 reduces the amount of air flowing through the condenser coil by approximately half, lowering the rate of condensation of the refrigerant and, thus, providing an automatic control of the refrigerant pressure within the condenser and evaporator coils. It will be appreciated that the vanes 54 will be fully open when the compressor 18 begins to cycle, due to the motor 36 being previously energized by the switch 98, insuring that there will be only a partial flow of air through coil 20 when the compressor begins operating.

By incorporating the ventilating and exhausting of the enclosure 10 in the air-conditioning equipment housing 16 to form a complete unit, total air-conditioning of the enclosure is possible, wherein minimum expenses are incurred in order to provide proper enclosure temperatures. The incorporation of cooling and ventilating apparatus in a common unit eliminates the necessity for separate exhaust fans and ventilators, simplifying installation of the air-conditioning equipment. The dual function of the fan 34 for drawing air through the condenser coil and exhausting the enclosure 10 also reduces costs and by providing a linked interconnection between the ventilating, exhaust and recirculating vanes, a versatility and economy of operation is possible which is difficult to achieve with separate cooling and ventilating systems.

It is appreciated that various modifications to the invention may be apparent to those skilled in the art without departing from the spirit and scope thereof and it is intended that the invention be defined only by the following claims.

I claim:

1. A system for air-conditioning an enclosure having an air inlet and an air outlet comprising, in combination, a housing, a refrigeration system within said housing including a compressor, an evaporator coil and a condenser coil, a first fan within said housing communicating with said air inlet adapted to force air through said evaporator coil and into said enclosure through said air inlet, a return air passage defined in said housing selectively communicating with said evaporator coil in communication with said enclosure air outlet, a condenser coil chamber defined in said housing having a cooling air inlet and an exhaust outlet, said condenser coil being disposed adjacent said cooling air inlet whereby air passing through said cooling air inlet passes through said coil, an exhaust fan within said chamber adapted to exhaust air therefrom through said exhaust outlet, an exhaust air passage defined in said housing in selective communication with said return air passage and said chamber, a ventilating air passage defined in said housing in selective communication with said evaporator coil, first air valve means within said return air passage spaced from said enclosure outlet, second air valve means within said exhaust air passage, said exhaust air passage communicating with said return air passage intermediate said enclosure outlet and said first valve means, third air valve means within said ventilating air passage, control means connected to said air valve means, compressor, first fan and exhaust fan, and ventilating air temperature-sensing means and enclosure air temperature-sensing means regulating operation of said control means.

2. In a system for air-conditioning as in claim 1 wherein common control means are associated with said air valve means wherein said air valve means are simultaneously operated and operated in predetermined relationship to each other.

3. In a system for air-conditioning as in claim 2 wherein upon said ventilating air temperature-sensing means sensing ventilating temperature above a first predetermined value said second and third valve means substantially close and said first valve means open and cooling of said enclosure is by operation of said refrigeration system, upon said ventilating air tmeperature sensing a ventilating temperature below a second predetermined value said valve means modulating to mix ventilating air and recirculated air under the control of said enclosure air temperature-sensing means, and upon said ventilating air temperature-sensing means sensing a temperature intermediate said first and second predetermined temperatures said second and third valve means being open and said first valve means being closed whereby said refrigeration system is controlled by said enclosure air temperature-sensing means and said exhaust fan drawing air into said chamber through said cooling air inlet and said exhaust air passage.

4. The method of controlling the condenser and evaporator pressure of an air-conditioning refrigeration system cooling an enclosure wherein the temperature of the air for cooling the condenser coil is of such a temperature as to cause a lowering of the condenser refrigerant pressure, the refrigeration system condenser coil being located within a compartment having first and second air inlets and an outlet, a fan being located adjacent said outlet and said condenser coil being located adjacent said first inlet whereby condenser cooling air entering said compartment through said first inlet passes through said condenser coil, said second inlet being interposed between said enclosure and said compartment, comprising the steps of sensing the temperature of the condenser cooling air, rotating said fan, sensing the temperature of the air within the enclosure and exhausting air from said enclosure into said compartment through said second inlet upon the occurrence of predetermined temperature conditions of the condenser cooling air and the air within the enclosure to reduce the amount of air passing through said first inlet and condenser coil.

5. A system for air-conditioning an enclosure comprising, in combination, a refrigeration system including a compressor, a condenser coil and an evaporator coil, a first fan adapted to force air over said evaporator coil into said enclosure, a second fan adapted to force air through said condenser coil, a return air passage having an inlet communicating with said enclosure and an outlet disposed toward said evaporator coil for selective communication therewith, a ventilating air passage adapted to selectively communicate with said evaporator coil, an exhaust air passage having an inlet communicating with said return air passage intermediate the inlet and outlet thereof and an outlet communicating with the low pressure side of said second fan, a first air valve within said return air passage outlet controlling air flow therethrough, a second air valve within said ventilating air passage controlling air flow therethrough, a third air valve within said ventilting air passage controlling air flow therethrough and common control means connected to said valves simultaneously operating said valves for providing selective or simultaneous air flow through said air passages.

References Cited

UNITED STATES PATENTS

| | | | |
|---|---|---|---|
| 2,212,356 | 8/1940 | Shure | 62—427 |
| 2,309,224 | 1/1943 | Terry | 62—186 |
| 2,317,104 | 4/1943 | Moore | 62—427 |
| 2,401,560 | 6/1946 | Graham | 62—262 |
| 2,711,086 | 6/1955 | Eilers | 62—427 |
| 2,711,087 | 6/1955 | Jennings | 62—262 |
| 2,715,324 | 8/1955 | Rose | 62—262 |
| 2,769,320 | 11/1956 | Kuhlenschmidt | 62—427 |
| 2,778,197 | 1/1957 | Legeza | 62—262 |

WILLIAM J. WYE, *Primary Examiner.*